July 14, 1959     K. H. HACHMUTH     2,894,997

FRACTIONAL CRYSTALLIZATION PROCESS AND APPARATUS

Filed March 7, 1955     2 Sheets-Sheet 1

INVENTOR.
K. H. HACHMUTH

BY *Hudson and Young*

ATTORNEYS

July 14, 1959     K. H. HACHMUTH     2,894,997
FRACTIONAL CRYSTALLIZATION PROCESS AND APPARATUS
Filed March 7, 1955     2 Sheets-Sheet 2
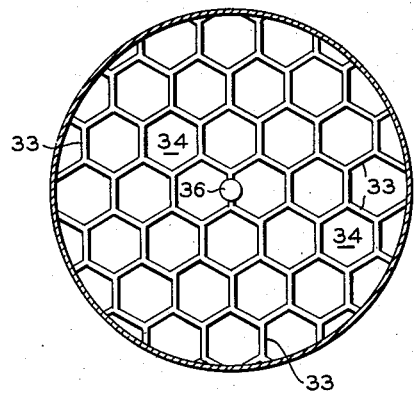
FIG. 3.
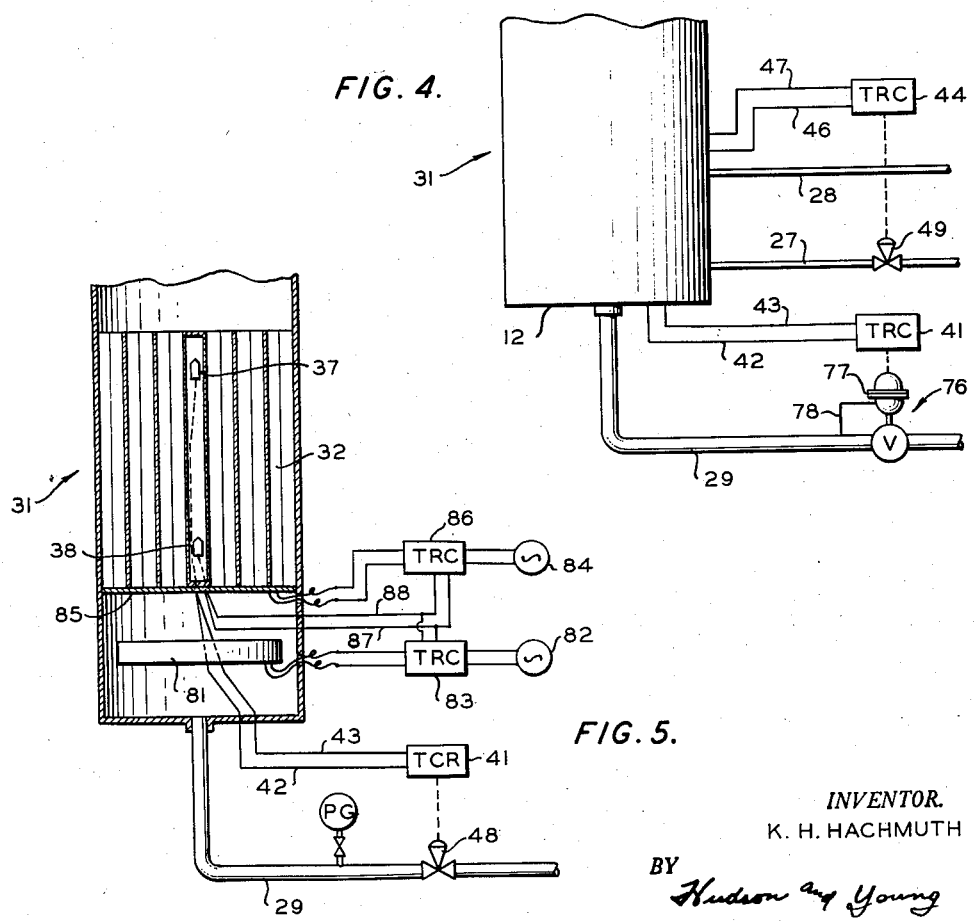
FIG. 4.
FIG. 5.
INVENTOR.
K. H. HACHMUTH
BY
ATTORNEYS

United States Patent Office 2,894,997
Patented July 14, 1959

2,894,997

FRACTIONAL CRYSTALLIZATION PROCESS AND APPARATUS

Karl H. Hachmuth, Bartlesville, Okla., assignor to Phillips Petroleum Company, a corporation of Delaware Application March 7, 1955, Serial No. 492,667

15 Claims. (Cl. 260—666)

This invention relates to the separation and purification of components from liquid mixtures. In one of its aspects, it relates to the separation and purification of liquid multi-component mixtures by fractional crystallization. In another of its aspects, it relates to a method for controlling the operation of the crystal separation and purification column of fractional crystallization apparatus. In yet another of its aspects it relates to improved fractional crystallization apparatus which includes means for controlling the temperature within the crystal separation and purification column.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may well be the only method which can be advantageously employed.

As well as offering in some cases perhaps the only practicable method of separation, the crystallization method offers the further advantage of being the only separation method which theoretically gives a pure product in a single stage of operation. In actual practice, however, the crystals obtained from a solution of several components will be impure because of the occlusion of mothor liquor within the crystal interstices. In the conventional fractional crystallization processes, the crystal yield from one batch crystallization is redissolved in a solvent or remelted and again crystallized to effect further purification. The recrystallized product will have less impurity since the concentration of impurity in the new liquor is less than in the previous liquor of crystallization. Such processes require a large amount of equipment and floor space for their operation with resulting high operating expenditures in terms of labor and equipment costs. Furthermore, in these types of processes, the purity of the product is limited by the number of stages through which the process is carried.

More recently, a continuous method of separating and purifying liquid multi-component mixtures has been advanced which overcomes the disadvantages of conventional fractional crystallization processes. This method involves the use of a purification column in one end of which a melting section is maintained. The crystals upon introduction into the purification column are moved therethrough toward the melting section where the crystals are melted. A portion of the resulting melt is passed as reflux countercurrent to crystal movement and in intimate contact therewith so as to displace occluded impurities. The present invention constitutes an improvement upon fractional crystallization apparatus which utilizes a reflux stream to produce a high purity product.

When practicing a fractional crystallization process as described hereinabove, the high purity of product obtainable is believed to be due at least in part to the action of the reflux stream in contacting the crystals. It is believed that the reflux stream refreezes upon the crystals moving toward the melting zone, thereby displacing occluded impurities. A stream comprising displaced impurities is thereafter removed from the column upstream, with respect to crystal movement, of the melting zone. In order to effect a high degree of purification, it is important that all of the crystals be contacted with the reflux stream prior to entering the melting zone.

The refreezing of the reflux stream upon the crystals so as to displace occluded impurities is believed to occur in a comparatively narrow zone adjacent the melting zone. In certain isolated instances, the warm end of the crystal bed may become so dense as a result of the refreezing of the reflux stream as to cause plugging of the column. This undesirable result is more liable to occur when operating the column so as to obtain a high degree of purification. Thus, in order to obtain a high degree of purification, it becomes necessary to increase the amount of liquid passed as a reflux stream into the moving mass of crystals, and the higher the desired purity of the product the denser the warm end of the crystal bed becomes and the more difficult it is to force the reflux liquid required up through the crystal bed.

The reflux stream in refreezing upon the crystals gives up heat which raises the temperature of the crystals in the warm end of the crystal bed. This is the major source of heat for raising the temperature of the crystals to their melting point. As the difference between the crystal inlet temperature and the crystal melting point increases, it becomes necessary to increase the amount of reflux liquid in order to supply the required amount of heat. And, as mentioned above, the refreezing of an increasing amount of reflux liquid may in some cases cause the column to become plugged.

Since no appreciable amount of heat is conducted through the crystal bed from the melting zone, it would be desirable if the purification column were provided with means for transferring heat through the crystal bed from the melting zone. It has recently been proposed by T. A. Tarr in copending U.S. application Serial No. 477,099, filed December 22, 1954, that the purification column be provided with a grid member in order to effect a transfer of heat through the warm end of the crystal bed and thereby prevent the bed from becoming so dense as to cause plugging of the column. I have found that still further improvement can be realized if the temperatures at certain points within the crystal bed are known and controlled. In accordance with the present invention, means are provided for measuring and controlling the temperature within the crystal bed with the result that heat is conducted through the bed in the amount required to maintain the purification column in an operable range.

The following are objects of the invention.

It is an object of the invention to provide improved fractional crystallization apparatus.

Another object of the invention is to provide a method for controlling the temperature gradient within the separation and purification column of fractional crystallization apparatus.

Still another object of the invention is to provide means for controlling temperature and for transferring heat within the crystal purification column of fractional crystallization apparatus.

A further object of the invention is to provide a method for controlling the rate of product withdrawal from a crystal purification column of fractional crystallization apparatus.

A still further object of the invention is to provide a method for operating a crystal purification column of fractional crystallization apparatus so as to obtain a consistently high degree of product purification.

Other and further objects of the invention will become apparent to one skilled in the art upon consideration of the following disclosure.

Broadly speaking, the present invention resides in a method for controlling temperatures within the crystal purification column of fractional crystallization apparatus and in means for accomplishing such control. In accordance with a broad aspect, the invention comprises transferring heat from the crystal melting zone in one end of a purification zone into the crystal bed therein, while maintaining the warm end of the purification zone at a temperature above the melting point of the crystals, at a rate sufficient to maintain an intermediate portion of the crystal bed at a temperature above that of the crystals entering the purification zone. More specifically, the process of this invention comprises supplying heat to a melting zone in one end of a crystal purification zone at a rate sufficient to maintain the warm end of the purification zone at a temperature above the melting point of the crystals and withdrawing the product from the melting zone at a rate sufficient to maintain an intermediate portion of the crystal bed at a temperature above that of the crystals entering the purification zone. I have found that by operating the purification column in accordance with predetermined crystal bed temperatures, it is possible to obtain a consistent and uniform performance.

The process and apparatus of this invention are applicable to a vast number of simple binary and complex multi-component systems. The invention is particularly applicable to the separation of hydrocarbons which have practically the same boiling points, and are, therefore, difficult to separate by distillation. Where high boiling organic compounds are concerned, separation by distillation is often undesirable because many such compounds are unstable at high temperatures. Specific examples of organic systems to which this invention is applicable are recited in copending U. S. application, Serial No. 438,051, filed June 21, 1954, and of particular importance, there may be mentioned separation of systems containing xylenes, systems containing cyclohexane, systems containing normal paraffins, and systems containing benzene, and the like. Thus, paraxylene can be separated from a multi-component mixture comprising isomeric alkyl benzenes, e.g., from a mixture of para- and meta-xylenes or from para-, meta-, and ortho-xylenes. In the same manner, benzene can be separated from a mixture comprising benzene and a paraffinic hydrocarbon such as n-hexane or n-heptane. Benzene may also be separated from a mixture of toluene and/or aniline. Cyclohexane can be separated from a mixture comprising cyclohexane and paraffinic hydrocarbons such as isomeric hexanes boiling close to cyclohexane.

Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes. This invention can also be utilized to purify naphthalene, hydroquinone (1,4-benzenediol), paracresol, para-dichlorobenzene, and such materials as high melting waxes, fatty acids, and high molecular weight normal paraffins. Furthermore, the invention can be used to separate anthracene, phenanthrene, and carbazole and to separate durene (1,2,4,5-tetramethylbenzene) from $C_{10}$ aromatics.

It is not intended, however, to limit the invention to organic mixtures, but rather it is applicable to inorganic mixtures as well, and offers a practical method of separating, for example, two inorganic components between which solvates or hydrates are formed. Examples of inorganic systems to which this invention is applicable are those for the recovery of pure salts, such as ammonium nitrate, and of anhydrous salts from their hydrates.

In certain cases, it may also be desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple and tomato. It is also possible to concentrate vegetable juices and beverages such as milk, beer, wine, coffee and tea by this method. The desired degree of concentration can be closely controlled by varying the amount of liquid passed upwardly through the downwardly moving mass of crystals. This aspect of the invention is in general applicable in those instances where it is desired to increase the concentration of a solution by removing at least a portion of the solvent therefrom.

A more comprehensive understanding of the invention may be obtained by referring to the following description and the drawing, in which:

Figure 3 is a cross-sectional view taken along line 3—3 of Figure 1, illustrating a modification of the grid member;

Figure 4 is a partial elevational view illustrating a modification of the invention; and Figure 5 is a partial elevational view, partly in section, illustrating another modification of the invention.

Figure 1:
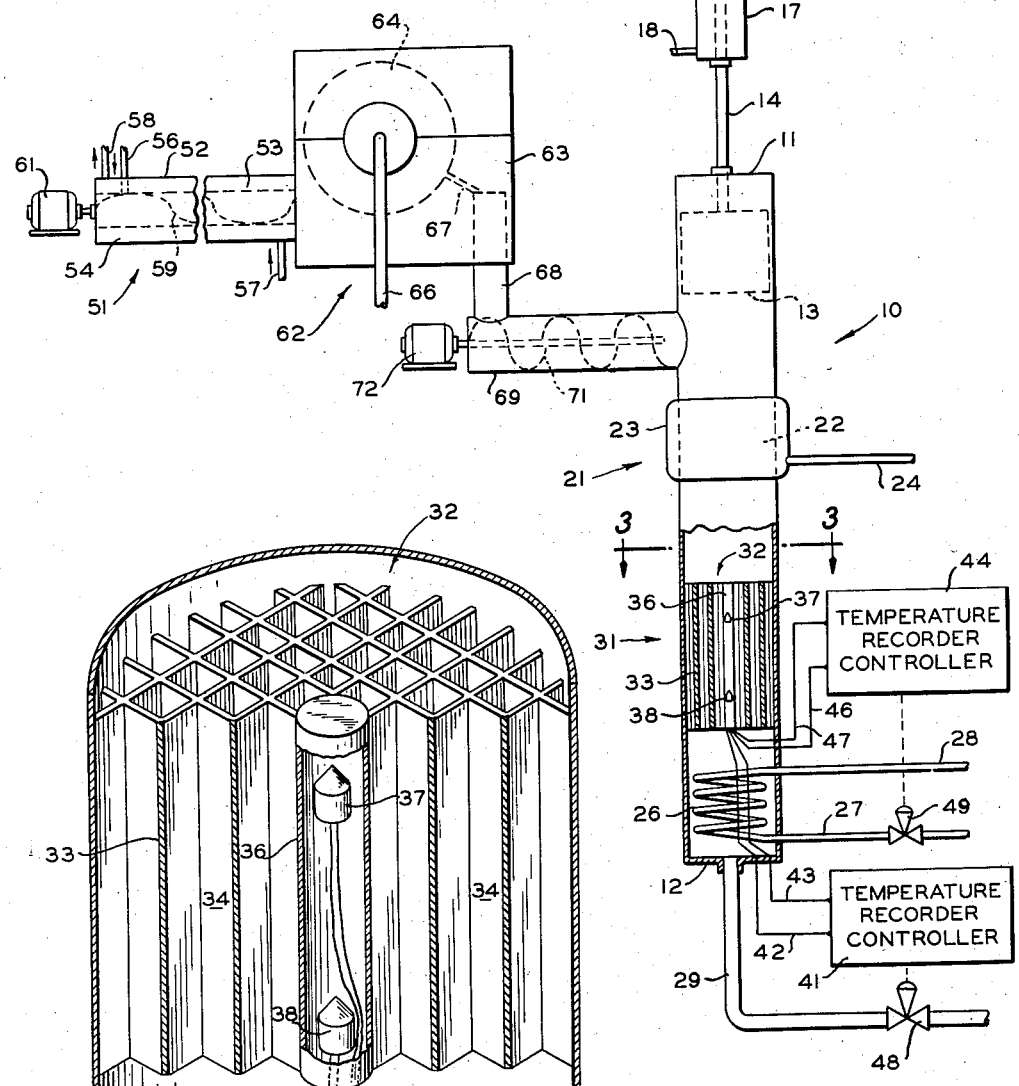
Figure 1 is an elevational view, partly in section, of fractional crystallization apparatus illustrating the present invention.

Referring to Figure 1 of the drawing, fractional crystallization apparatus is illustrated which comprises an elongated crystal separation and purification column 10 closed at its upper and lower ends by closure members 11 and 12, respectively. The upper end of column 10 is provided with a crystal compacting means or crystal mover, such as an impervious piston 13, connected by a connecting rod 14 to a hydraulic piston 16 in hydraulic cylinder 17. Lines 18 and 19 serve to pass hydraulic fluid alternately into and out of cylinder 17 so as to drive piston 16 which in turn causes the movement of piston 13. While piston 13 is shown as being an impervious piston, it is within the scope of the invention to use a porous piston in which case the piston operates as a filter as well as a means for moving crystals. When operating the column with a porous piston, an outlet line is connected to the upper end of the column for removal of the liquid therefrom.

Filter section 21, disposed in an intermediate portion of crystal separation and purification column 10, comprises a filter screen 22, substantially cylindrical in shape, surrounded by a jacket 23. Line 24 is connected to jacket 23 for withdrawal of liquid from the filter section. A heating means is disposed in the lower end of column 10 in order to maintain a relatively high temperature in that end. As illustrated, the heating means is a coil 26 connected to inlet line 27 and outlet line 28. It is not intended to limit the invention to the specific heating means shown, for other suitable means can be employed as will become evident upon consideration of Figure 5 of the drawing. A liquid outlet line 29 is connected to the end of column 10 in order to provide means for removal of melt from the melting zone maintained in that end of the column by the heating means.

Figure 2:
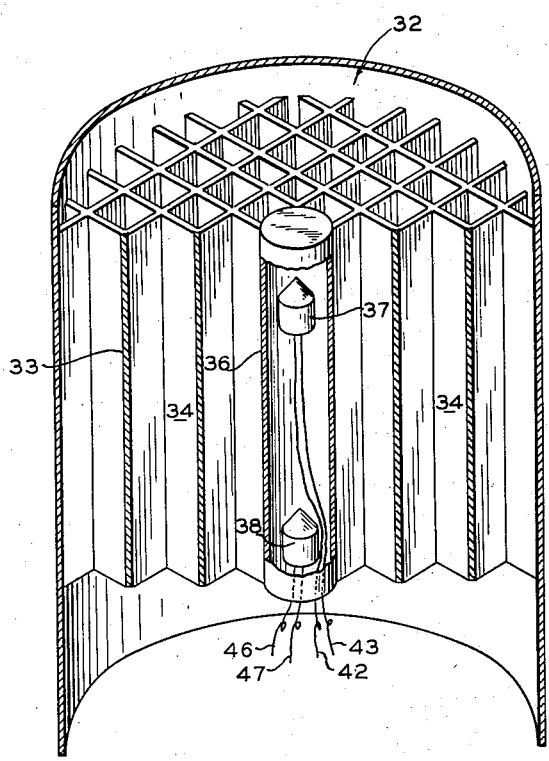
Figure 2 is a perspective sectional view illustrating the grid member of Figure 1.

The portion of column 10 below filter section 21 and with which the filter section communicates is the purification section 31 of the column. Disposed within the purification section between filter section 21 and heating means 26 is a heat conducting means such as grid member 32. A clearer understanding of the structure of the grid member may be obtained by referring to Figure 2 as well as to Figure 1. Grid member 32 comprises longitudinally extending partitions 33 which are arranged so as to form a plurality of cells or passageways 34 open at both ends. As shown in Figure 2, the partitions are so assembled that each of the cells, except those adjacent the column wall, has a substantially square cross section. An example of another form which a grid member may take is shown in Figure 3 in which the grid is illustrated as comprising cells or passageways having a hexagonal cross section. It is apparent that the heat conducting means of this invention can take still other forms which will fall within the spirit or scope of this invention. For example, the grid member may be formed by brazing together a bundle of cylindrical tubes. The grid member is preferably constructed of a metal which has good heat conducting properties such as copper, silver or aluminum. It is also within the scope of the invention to utilize alloys of these and similar metals where required for structural reasons.

As shown in Figure 1, grid member 32 is positioned within the column between filter section 21 and heating means 26. The bottom end of the grid member is preferably located just above the heating means while the top of the grid is preferably disposed at least one purification column diameter below the bottom limit of the drive piston travel. It is to be understood that the invention is not limited to a grid member of any specific length, for the grid length can vary within relatively wide limits. For example, a grid member having a length of as little as one inch and as great as ten inches and greater may be used without departing from the scope of the invention.

A closed tube 36 centrally disposed within the grid member extends parallel to the axis of purification column 10. The tube is formed of the same metal as the grid member and is brazed or welded thereto in order to give good heat conduction. Disposed within the tube are upper and lower temperature measuring elements such as thermocouples 37 and 38. The upper thermocouple is located near the top end of the tube while the lower thermocouple is positioned near the bottom end of the tube. More specifically, the thermocouples are preferably positioned within the upper one-fifth and the lower one-fifth of the grid member length. For example, if the grid member is eight inches long, the upper thermocouple is located between 1 and 2 inches from the top of the grid member while the lower thermocouple is positioned between 1 and 2 inches from the bottom of the grid member. It is not intended to limit the invention to thermocouples, for any suitable temperature measuring devices, e.g., resistance thermometers, can be utilized, which can be positioned within the tube. While the thermocouples, as illustrated, are positioned in a single tube, it is within the scope of the invention to locate each one in a separate tube. In such a case, the two tubes are preferably symmetrically located within the grid member. Furthermore, the thermocouples can be attached, as by welding, directly to one of the partitions of the grid member without departing from the scope of the invention, in which case the tubes may be eliminated. Upper thermocouple 37 is operatively connected to temperature recorder controller 41 by electrical leads 42 and 43 while lower thermocouple 38 is similarly connected to temperature recorder controller 44 by electrical leads 46 and 47. Temperature recorder controller 41 is operatively connected to a flow control means such as motor valve 48 in product withdrawal line 29. Temperature recorder controller 44 is operatively connected to a flow control means such as motor valve 49 in heat exchange fluid inlet line 27. The control instruments utilized herein are commercially available items of manufacture, and may be either of the pneumatic or electrical type. Such instruments may be purchased from the Taylor Instrument Companies, Rochester, N.Y., or from the Brown Instrument Company, Philadelphia, Pennsylvania.

Chiller 51 comprises inner and outer cylinder 52 and 53, spaced apart so as to form an annular space 54 therebetween. Feed line 56 is connected to the inner cylinder for introduction of feed material. Lines 57 and 58 provide means for circulating a refrigerant, such as expanding liquid propane, through annular space 54. An auger 59, disposed within inner cylinder 53 and connected to motor 61, provides means for moving crystal slurry through the chiller. It is to be understood that other suitable refrigeration means, e.g., a direct refrigeration means, can be utilized, which come within the scope of the invention.

The delivery end of chiller 51 is connected to rotary filter 62 which serves as a prefilter. Rotary filter 62 comprises a container 63 in the bottom of which the crystal slurry from chiller 51 collects. Rotating drum 64, located within container 63, has its surface covered with a suitable filter medium on which the crystal cake forms. Line 66 is for the withdrawal of mother liquor from the filter while doctor blade 67 provides means for removing crystals from the filter medium of the rotating drum. Conduit 68 disposed below doctor blade 67 connects the filter to slurry inlet conduit 69. While the prefilter is preferably a rotary filter as illustrated, other filtering means may be employed such as an in-line filter or a centrifuge. Slurry inlet conduit 69 is connected to column 10 at a point above filter section 21 and below piston 13 when the piston is at the end of its back stroke. It is noted that piston 13 is of such a length that at the end of its compression or downward stroke it blocks the entrance of conduit 69 into column 10. An auger 71 positioned within conduit 69 and connected to a motor 72 provides means for moving crystals into the column. It is also within the scope of the invention to omit the prefilter in which case the discharge end of the chiller is connected directly to column 10. Whether a prefilter is utilized is dependent primarily upon the composition of the feed mixture. With a lean feed it has been found to be desirable to use a prefilter, but with a rich feed it is preferred to operate without the prefilter.

Referring to Figure 4 of the drawing, there is illustrated an arrangement of apparatus which can be advantageously used with crystal purification columns utilizing a piston as the means for advancing crystals through the column. Identical reference numerals have been used to designate elements previously described in conjunction with Figure 1. In this modification of the invention, a self-actuated back pressure control valve 76 is provided in product withdrawal line 29 instead of a motor valve as shown in Figure 1. Control valve 76 comprises a diaphragm 77 which operates to open the valve in accordance with the pressure applied to the under and upper sides of the diaphragm. Line 78 connects product withdrawal line 29 to the underside of diaphragm 77 while the upper side of the diaphragm is subjected to the pneumatic signal supplied by temperature controller recorder 41.

With reference to Figure 5 of the drawing, there is illustrated a modification of the invention which utilizes electrical heating means to supply heat to the warm end of the purification column. Elements similar to those described in the discussion of Figure 1 are designated by identical reference numerals. An electrical heater 81 disposed in the bottom of column 10 is connected to a source of electrical current 82 through temperature recorder controller 83. In this modification of the invention, means are also provided for directly heating the lower end of grid member 32. Thus, the end of the grid member is provided with a series of horizontal resistance elements 85 which are in the form of strips in contact with the lower end of the grid member. The resistance elements are connected to a source of alternating current 84, or if desired to the same source as electrical heater 81, through temperature recorder controller 86. Temperature recorder controllers 83 and 86 are further operatively connected to lower thermocouple 38 by means of electrical leads 87 and 88.

Still other arrangements of the heating means can be used which fall within the spirit and scope of the invention. For example, the electrical heater can be positioned in contact with the end of the grid member in which case the resistance elements may be omitted. Furthermore, it is within the contemplation of the invention to employ the resistance elements in contact with the lower end of the grid member to provide all of the required heating and omit the electrical heater. It is also within the scope of the invention to provide heating means which will generate heat within the grid member itself, e.g., by utilizing longitudinally extending resistance elements in contact with partition members of the grid. Another arrangement of a grid member and heating means which can be advantageously used comprises a heater whose heating element is in the form of a flat spiral. The grid member is likewise constructed as a spiral and comprises a spiral partition or fin member formed of a sheet of metal having good heat conducting properties. The fin member is attached, as by welding, directly to the heating element, and extends upwardly therefrom when in position within a vertically disposed separation and purification column. The upper end of the fin member may be sharpened to a knife edge in order to reduce resistance to crystal flow. The spiral grid member is provided with a centrally located tube or a pair of symmetrically placed tubes to house the thermocouples, or the thermocouples may be welded directly to the fin member. It is apparent that still other means for supplying heat to the warm end of the purification column can be used which will come within the spirit and scope of the invention.

While the fractional crystallization apparatus of the invention is illustrated and described as occupying a substantially vertical position, it is not intended to so limit the invention. It is to be understood that the apparatus can be otherwise disposed without departing from the spirit or scope of the invention. Thus, the separation and purification column can be positioned horizontally, or the column can be operated vertically but with the melting zone in the top of the column rather than the bottom as illustrated. Furthermore, while the invention has been described in conjunction with a separation and purification column which utilizes a piston as a means for advancing crystals through the column, the invention is not limited to any specific column, but rather it is applicable to any crystal purification column which utilizes a reflux stream to obtain a high purity product.

In the operation of the apparatus of Figure 1, a liquid feed mixture, which can be a liquid multi-component mixture containing components of different melting points, is introduced through line 56 into chiller 51. A refrigerant is passed into annular space 54 between the inner and outer cylinders of the chiller through line 57 and withdrawn therefrom through line 58 at a rate sufficient to maintain chiller 51 at a temperature low enough to crystallize one of the components. The crystal slurry formed within chiller 51 is moved into container 63 of rotary filter 62 through the operation of auger 59. Drum 64 in rotating within container 63 picks up crystals on its filter medium from the slurry collected in the bottom of the container. Mother liquor is removed from the crystals formed on the filter medium through line 66, leaving a filter cake which is scraped from the filter medium by means of doctor blade 67. The crystals still containing some mother liquor pass through conduit 68 into feed conduit 69.

From conduit 69 the thickened slurry of crystals in mother liquor is moved by means of auger 71 into separation and purification column 10. As previously discussed, piston 13 is so constructed that introduction of material into the column is possible only when the lower end of the piston is above the entrance end of conduit 69. The slurry on entering column 10 is moved downwardly by piston 13 into filter section 21. Piston 13 is forced downwardly and upwardly by means of hydraulic piston 16 which is moved in response to fluid introduced into and withdrawn from hydraulic cylinder 17 through lines 18 and 19. By this manner of operation, piston 13 on its compression stroke forces crystals downwardly through the column while during part of its back and compression strokes crystals are allowed to pass into the column through feed conduit 69.

Within filter section 21 additional mother liquor is separated from the crystals and removed from the column through line 24. The crystals thereafter continue their movement downwardly through the column as a result of the force exerted by piston 13. On leaving filter section 21, the crystals are moved as a single uniform mass having a cross-sectional area equal to that of the column. With further downward movement of the crystals, the mass of crystals encounters grid member 29 and is thereby divided into a plurality of uniform masses or streams of crystals, each having a cross-sectional area equal to that of the individual cells or passageways 34. The crystals continue to move downwardly through the grid member and thereafter enter the melting zone maintained in the end of the column.

As discussed hereinabove, the grid member provides means for transferring heat through the warm end of the crystal bed so that the bed will not become so dense as to cause plugging of the column. It has been found that by controlling the amount of heat conducted by the grid member through the warm end of the crystal bed so as to maintain the upper and lower ends of the grid at predetermined temperatures, consistent and uniform results can be obtained while operating the column so as to produce high purity products. By controlling the temperature of the grid member in this manner, the temperature of the warm end of the crystal bed is in effect controlled so that the temperature rise within the bed starts at a point above the bottom of the bed, i.e., at a point near the top of the grid member. There is thus avoided the effect of a sudden temperature rise in the bottom of the crystal bed adjacent the melting zone, e.g. a temperature rise from about the temperature of the entering feed slurry to about the melting point of the crystals. In other words the temperature rise within the purification column is spread out over a larger portion of the column by providing for a controlled transfer of heat within the warm end of the column. Furthermore, the purification column can be operated over a wide temperature range without plugging of the column. As mentioned hereinabove, the reflux stream in refreezing upon the crystals gives up heat which raises the temperature of the crystals in the lower end of the crystal bed. Because of the transfer of heat from the melting zone through the lower portion of the crystal bed, it becomes unnecessary to supply as much reflux liquid to raise the temperature of the crystals to their melting point, or alternatively with the same amount of reflux liquid the column can be operated at a lower crystal inlet temperature without the bed becoming so dense as to cause plugging of the column.

Heat exchange fluid is circulated through heating means 26 at a rate sufficient to maintain the bottom of the grid member at a predetermined temperature. This is accomplished by giving temperature recorder controller 44 a setting several degrees higher than the melting point of the crystals. The amount of the setting above the crystal melting point can vary within wide limits, e.g., between 3° F. and 20° F., the only limitations being those imposed by practical considerations. For example, some materials are thermally unstable at temperatures a little above their melting points. On leaving the passageways of the grid member, the crystals are melted, and a portion of the resulting melt is displaced upwardly as a reflux stream into the downwardly moving crystals and an intimate contact therewith. In normal operation substantially all of the melting of the crystals is believed to occur in the melting zone adjacent the lower end of the grid member. It may happen in some cases, e.g., when the lower end of the grid member is maintained at a temperature well above the crystal melting point, that some melting of the crystals will take place within the grid member itself. The effect of this manner of operation is merely to move the extent of the melting zone up into the lower end of the grid member. A liquid stream comprising displaced impurities is removed from column 10 through filter section 21 by means of line 24. A substantially pure product in the form of melt is withdrawn from the lower end of the column through line 29.

The rate of product withdrawal is controlled so that the temperature of the upper end of the grid member is maintained somewhat above the inlet temperature of the crystal slurry, e.g., from 2° F. to 10° F. above the temperature of the feed slurry. This is accomplished by giving temperature recorder controller 41 the temperature setting at which it is desired to maintain the upper end of the grid member. The temperature controller then operates motor valve 48 so that product is withdrawn at such a rate that the temperature of the upper end of the grid as measured by thermocouple 37 is maintained at the set value. Thus, if the temperature of the top of the grid is too high, temperature controller recorder 41 operates to open motor valve 48 so as to permit more product to be withdrawn from the melting zone. As a result of removing more product, the amount of melt passed into the crystal bed as a reflux stream is decreased, and the temperature of the top of the grid is concomitantly lowered. When the temperature of the top of the grid is too low, temperature controller recorder 41 operates to cut back on the rate of product withdrawal, thereby increasing the amount of reflux liquid passed into the moving crystals and raising the temperature on the top of the grid. As previously noted, the refreezing of the reflux stream upon the crystals so as to displace occluded impurities occurs in a zone of high purity adjacent the melting zone. The density and depth of this high purity zone are dependent upon the amount of liquid refluxed. Thus, by controlling the amount of liquid refluxed so as to maintain the upper end of the grid member at a predetermined temperature, it is possible to maintain control over the density and depth of the high purity zone.

By operating the crystal separation and purification column as described above, the upper end of the grid member is maintained at a temperature somewhat above the temperature of the feed slurry while the lower end of the grid is maintained at a temperature somewhat above the melting point of the crystals. As described, the temperature of the lower end of the grid member is controlled by varying the amount of heat supplied to the column by the heating means whereas the temperature of the upper end of the grid is controlled by regulating the rate of product withdrawal. It is, however, to be understood that the temperature of the upper end of the grid member can be controlled by varying the amount of heat put into the column while the temperature of the lower end of the column is controlled in accordance with the rate of product withdrawal.

Referring to Figure 4 of the drawing, there is shown an arrangement of apparatus which can be advantageously used with a piston type purification column as shown in Figure 1. When a piston is utilized to move the crystals through the column, the resulting periodic pressure surges at the bottom of the column may make desirable a method of controlling the rate of product withdrawal which takes into account the variations in pressure occurring within the system. As shown in Figure 4, the under side of the diaphragm of control valve 76 is connected to the product withdrawal line by means of line 78. When the pressure rises within purification column 10, the diaphragm operates to open the valve, and product is withdrawn during the compression stroke of piston 13. The upper side of the diaphragm is subjected to the pneumatic signal generated by temperature controller recorder 41, which in turn is dependent upon the temperature of the top of the grid member as measured by thermocouple 38. When the temperature of the top of the grid is too high, the fluid pressure on the top of diaphragm 77 is reduced, thereby allowing more product to escape during the compression stroke of the piston. Or if the temperature of the top of the grid is too low, the fluid pressure on the top of the diaphragm is increased, thereby lowering the rate of product withdrawal and permitting more reflux liquid to pass through the column. The operation of the apparatus of Figure 4 is in other respects similar to the operation of Figure 1.

The operation of the apparatus of Figure 5 is essentially the same as that of Figure 1 except for the manner in which heat is supplied to the end of the purification column. In some cases, it may be desirable to apply heat directly to the grid member as well as to provide means for introducing heat into the end of the purification column. Thus, as shown in Figure 5, an electrical heater 81 is utilized to supply heat to the end of purification column 10 while electrical resistance elements are employed to apply heat directly to the end of grid member 32. The amount of heat supplied to the column by electrical heater 81 and to the end of the grid member is controlled by temperature recorder controllers 83 and 86 so as to maintain the lower end of the grid member at a temperature somewhat above the melting point of the crystals. The temperature of the upper end of the grid member is controlled as described with relation to Figure 1 by regulating the rate of product withdrawal. The apparatus of Figure 5 can be advantageously utilized with systems where a great temperature difference exists between the melting point of the crystals and the temperature of the entering feed slurries.

A more comprehensive understanding of the invention may be obtained by referring to the following illustrative example, which is not intended, however, to be unduly limitative of the invention.

A feed material containing about 41 weight percent para-xylene is charged to the chiller of fractional crystallization apparatus similar to that of Figure 1 at a temperature of about 90° F. and at a rate of 520 pounds per hour. The feed mixture is cooled in the chiller to a temperature of −30° F., causing para-xylene to crystallize and forming a slurry containing 20 percent solids. The slurry is introduced into a rotary filter where mother liquor containing 26 weight percent para-xylene is separated from the slurry at a rate of 260 pounds per hour. The resulting slurry containing 40 percent solids is passed into the crystal separation and purification column at a rate of 260 pounds per hour. The slurry is moved through the column by means of a piston into the filter section where additional mother liquor containing 26 weight percent para-xylene is recovered at a rate of 156 pounds per hour. The mass of crystals as a result of the force exerted thereon by the column piston moves through the column toward the melting zone maintained in the end of the column. Downstream from the filter section, the moving mass of crystals is divided into a plurality of smaller moving masses of crystals by means of the grid member disposed within the column between the filter section and the melting zone. Heat is supplied to the melting zone at such a rate that the downstream end of the grid member, with respect to crystal movement, is maintained at a temperature of 60° F. After passing through the grid member, the crystals enter the melting zone where they are melted. A portion of the resulting melt is displaced as a reflux stream into the moving mass of crystals and refreezes upon the crystals displacing occluded impurities. A stream comprising displaced impurity passes through the column and is withdrawn through the filter section. A stream containing 99 weight percent para-xylene is withdrawn from the melting zone as a product of the process. The rate of product withdrawn is controlled so that the temperature of the upstream end of the grid member, with respect to crystal movement, is held at −27° F.

It will be apparent to those skilled in the art that various modifications of the invention can be made upon study of the accompanying disclosure. Such modifications are believed to be clearly within the spirit and scope of this invention.

I claim:

1. In a process for separating a component from a liquid multi-component mixture which comprises passing crystals, formed by said component by cooling said mixture, into a purification zone, moving said crystals through said purification zone toward a melting zone, in an intermediate portion of said purification zone passing said crystals through a plurality of adjacent passageways having walls formed of a material of high heat conductivity, moving said crystals from said passageways into said melting zone, melting crystals in said melting zone, displacing at least a portion of the resulting melt into said moving crystals, transferring heat through said material of high heat conductivity from said melting zone through said purification zone upstream crystalwise from said melting zone, and withdrawing a product from said melting zone, the improvement which comprises measuring the temperature within an intermediate portion of said purification zone; and controlling the rate of product withdrawal in response to said temperature measurement.

2. In a process for separating a component from a liquid multi-component mixture which comprises cooling said mixture so as to form a slurry of crystals of said component in mother liquor, separating crystals from said mother liquor, moving said crystals through said purification zone toward a melting zone, in an intermediate portion of said purification zone passing said crystals through a plurality of adjacent passageways having walls formed of a material of high heat conductivity, moving said crystals from said passageways into said melting zone, supplying heat to said melting zone, melting crystals in said melting zone, displacing a portion of the resulting melt into said moving crystals, transferring heat through said material of high heat conductivity from said melting zone through said purification zone upstream crystalwise from said melting zone, and withdrawing a product from said melting zone, the improvement which comprises measuring the temperature within an intermediate portion of said purification zone, measuring the temperature within a lower portion of said purification zone, controlling the supply of heat to said melting zone in response to one of said measurements, controlling the rate of product withdrawal in response to the other of said measurements, whereby the temperature in said lower portion of said purification zone is maintained at a higher level than said temperature within said intermediate portion of said purification zone.

3. In a process for separating a component from a liquid multi-component mixture which comprises cooling said mixture so as to form a slurry of crystals of said component in mother liquor, separating crystals from said mother liquor, moving said crystals through said purification zone toward a melting zone, in an intermediate portion of said purification zone passing said crystals through a plurality of adjacent passageways having walls formed of a material of high heat conductivity, moving said crystals from said passageways into said melting zone, supplying heat to said melting zone at a rate sufficient to maintain the temperature therein above the melting point of said crystals, thereby melting at least a portion of said crystals in said zone, displacing a portion of the resulting melt as a reflux stream into said moving crystals, transferring heat through said material of high heat conductivity from said melting zone through said purification zone upstream crystalwise from said melting zone, and withdrawing a product from said melting zone, the improvement which comprises measuring the temperature within an intermediate portion of said purification zone; and controlling the rate of product withdrawal in response to said temperature measurement.

4. In a continuous process for separating a component from a liquid multi-component mixture, said component forming crystals upon the cooling of said mixture, which comprises introducing said mixture into a cooling zone and cooling said mixture therein to a temperature such as to form a slurry of said crystals in mother liquor, passing said slurry into a filter zone, withdrawing mother liquor from said filter zone, passing said crystals from said filter zone into an elongated purification zone so as to form a mass of crystals therein; moving said mass of crystals through said purification zone toward a melting zone in the downstream end crystalwise of said purification zone, dividing said moving mass of crystals into a plurality of smaller moving masses of crystals by passing said mass of crystals into a plurality of adjacent passageways having walls formed of a material of high heat conductivity, supplying heat to said melting zone, melting crystals in said melting zone, displacing a portion of the resulting melt into said moving crystals, and withdrawing a product from said melting zone, the improvement which comprises continuously measuring the temperature of a downstream portion crystalwise of said passageways; supplying heat to said melting zone at a rate sufficient to maintain the temperature of said downstream portion of said passageways between about 3 and 20° F. above the melting point of said crystals; continuously measuring the temperature of an upstream portion crystalwise of said passageways; and controlling the rate of product withdrawn so as to maintain said latter temperature between about 2 and 10° F. above the temperature of said slurry of crystals in mother liquor.

5. The process of claim 2 in which said multi-component mixture comprises isomeric alkylbenzenes.

6. The process of claim 5 in which said mixture contains para-xylene, and said para-xylene is recovered as the product.

7. The process of claim 2 in which said multi-component mixture comprises benzene and a paraffinic hydrocarbon, and benzene is recovered as the product.

8. The process of claim 2 in which said multi-component mixture comprises cyclohexane and a paraffinic hydrocarbon, and cyclohexane is recovered as the product.

9. The process of claim 2 in which the supply of heat to said melting zone is controlled in response to the temperature within a lower portion of said purification zone; and the rate of product withdrawal is controlled in response to the temperature within an intermediate portion of said purification zone.

10. The process of claim 2 in which the rate of product withdrawal is controlled in response to the temperature within a lower portion of said purification zone; and the supply of heat to said melting zone is controlled in response to the temperature within an intermediate portion of said zone.

11. In apparatus for the separation of and purification of crystals comprising, in combination, an elongated, closed chamber, means for introducing crystals into one end portion of said chamber, heating means in the opposite end portion of said chamber, product outlet means in said opposite end portion of said chamber, flow control means in said product outlet means, and at least one filter means in said chamber between said crystal introduction means and said heating means, the improvement which comprises a grid member comprising longitudinally extending partitions positioned within said chamber between said filter means and said heating means; and means for measuring the temperature of one end of said grid member, said temperature measuring means being operatively connected to said flow control means in said product outlet means.

12. Apparatus for separating components of a liquid mixture which comprises, in combination, a crystal purification column; means for introducing crystals into one end of said column; means for melting crystals in the opposite end of said column; product outlet means connected to said opposite end of said column; flow control means in said product outlet means; at least one filtering means in said column between said crystal introduction means and said crystal melting means; a grid member comprising longitudinally extending partitions positioned within said column between said filtering means and said crystal melting means; means for measuring the temperature of one end portion of said grid member, said temperature measuring means being operatively connected to said flow control means; and means for measuring the temperature of the opposite end portion of said grid member, said means being operatively connected to said crystal melting means.

13. Apparatus for separating components of a liquid mixture which comprises, in combination, an elongated, closed purification column; a crystal mover in one end portion of said column; a heat exchange means operatively connected to the opposite end portion of said column; crystal inlet means communicating with said one end portion of said column; a first filtering means in said crystal inlet means; a second filtering means in said column between said crystal inlet means and said heat exchange means; outlet means in said opposite end portion of said column; flow control means positioned in said outlet means; a grid comprising longitudinally extending metal partitions positioned within said column between said second filtering means and said heat exchange means; a tubular member centrally positioned within said grid parallel to the axis thereof; a first temperature sensing element positioned within one end portion of said tubular member; a second temperature sensing element positioned within the opposite end portion of said tubular member; first temperature control means operatively connected to said first temperature sensing element and to said flow control means in said outlet means; and second temperature control means operatively connected to said second temperature sensing element and to said heat exchange means.

14. The apparatus of claim 13 in which said flow control means in said outlet means is a control valve which is operated in response to the pressure differential between the pressure in said outlet means and a pneumatic signal supplied by said first temperature control means.

15. In apparatus for the separation and purification of crystals comprising, in combination, an elongated, closed chamber, means for introducing crystals into one end portion of said chamber, heating means in the opposite end portion of said chamber product outlet means in said opposite end portion of said chamber, flow control means in said product outlet means, and at least one filter means in said chamber between said crystal introduction means and said heating means, the improvement which comprises a grid member comprising longitudinally extending partitions positioned within said column between said filter means and said heating means; means for measuring the temperature of one end portion of said grid member, said temperature measuring means being operatively connected to said flow control means; and means for measuring the temperature of the opposite end portion of said grid member, said means being operatively connected to said heating means.

References Cited in the file of this patent

UNITED STATES PATENTS

| 2,643,217 | Watson et al. | June 23, 1953 |
| 2,683,178 | Findlay | July 6, 1954 |